United States Patent
Kandoi et al.

(10) Patent No.: US 9,735,441 B2
(45) Date of Patent: Aug. 15, 2017

(54) HOT PRESSED, DIRECT DEPOSITED CATALYST LAYER

(75) Inventors: Shampa Kandoi, Ellington, CT (US); Robert Mason Darling, South Windsor, CT (US); William J. Bajorek, Cromwell, CT (US)

(73) Assignee: Audi AG, Ingolstadt (DE)

(*) Notice: Subject to any disclaimer, the term of this patent is extended or adjusted under 35 U.S.C. 154(b) by 335 days.

(21) Appl. No.: 13/876,928

(22) PCT Filed: Sep. 30, 2010

(86) PCT No.: PCT/US2010/002647
§ 371 (c)(1),
(2), (4) Date: Mar. 29, 2013

(87) PCT Pub. No.: WO2012/044273
PCT Pub. Date: Apr. 5, 2012

(65) Prior Publication Data
US 2013/0196245 A1   Aug. 1, 2013

(51) Int. Cl.
H01M 4/88 (2006.01)
H01M 8/00 (2016.01)
H01M 8/10 (2016.01)
H01M 8/1004 (2016.01)

(52) U.S. Cl.
CPC .......... H01M 8/10 (2013.01); H01M 4/8882 (2013.01); H01M 8/1004 (2013.01); *Y10T 156/10* (2015.01)

(58) Field of Classification Search
CPC .... H01M 8/10; H01M 8/1004; H01M 4/8882; Y01T 156/10

USPC ............. 429/479, 535; 427/115; 156/60
See application file for complete search history.

(56) References Cited

U.S. PATENT DOCUMENTS

| | | | |
|---|---|---|---|
| 5,234,777 A * | 8/1993 | Wilson | 429/490 |
| 5,330,860 A * | 7/1994 | Grot et al. | 429/494 |
| 5,399,184 A * | 3/1995 | Harada | H01M 8/1004 29/623.4 |
| 5,453,332 A | 9/1995 | Sakairi et al. | |
| 5,472,799 A | 12/1995 | Watanabe | |
| 5,607,785 A | 3/1997 | Tozawa et al. | |
| 5,766,787 A | 6/1998 | Watanabe et al. | |
| 5,882,810 A * | 3/1999 | Mussell | H01M 4/8642 204/282 |
| 6,524,736 B1 | 2/2003 | Sompalli et al. | |

(Continued)

FOREIGN PATENT DOCUMENTS

| EP | 1531510 A1 | 5/2005 |
|---|---|---|
| JP | 6-20709 A | 1/1994 |

(Continued)

OTHER PUBLICATIONS

The International Search Report and Written Opinion in counterpart International Application No. PCT/US2010/002647 filed Sep. 30, 2010.

(Continued)

*Primary Examiner* — Sean P Cullen
(74) *Attorney, Agent, or Firm* — Seed IP Law Group (57) ABSTRACT

A method of fabricating a membrane electrode assembly includes the steps of depositing a catalyst ink directly onto a membrane to form a catalyst coated membrane and hot pressing the catalyst coated membrane. The catalyst coated membrane has a catalyst layer that includes a catalyst and an ionomer.

19 Claims, 8 Drawing Sheets

(56) References Cited

U.S. PATENT DOCUMENTS

| | | |
|---|---|---|
| 7,011,905 B2 | 3/2006 | Sakamoto et al. |
| 7,955,758 B2 | 6/2011 | Yan et al. |
| 2004/0086632 A1 | 5/2004 | Vlajnic et al. |
| 2005/0163920 A1 | 7/2005 | Yan et al. |
| 2005/0181285 A1* | 8/2005 | Sakamoto et al. ............ 429/304 |
| 2006/0110631 A1 | 5/2006 | Olmeijer et al. |
| 2006/0280980 A1 | 12/2006 | Brack et al. |
| 2008/0191161 A1 | 8/2008 | Behl et al. |
| 2008/0286632 A1* | 11/2008 | Odgaard et al. ................ 429/40 |
| 2008/0292942 A1* | 11/2008 | You ...................... H01M 4/881 429/482 |
| 2008/0305250 A1 | 12/2008 | Yang et al. |
| 2010/0273084 A1* | 10/2010 | Shimomura .......... H01M 8/026 429/452 |

FOREIGN PATENT DOCUMENTS

| | | |
|---|---|---|
| JP | 2002-184415 A | 6/2002 |
| JP | 2002-280003 A | 9/2002 |
| JP | 2006-269122 A | 10/2006 |
| JP | 2007-524973 A | 8/2007 |
| JP | 2009-283187 A | 12/2009 |
| WO | 2004/051776 A1 | 6/2004 |
| WO | WO2005/074459 A2 | 8/2005 |

OTHER PUBLICATIONS

English Translation of Japanese Office Action mailed Aug. 4, 2014 for corresponding JP Application No. 2013-531540, 10 pages.

Machine Translation of Ikeda, *Everything of fuel cell*, Tokyo, Yoichiro Nakamura, 2001, 4 pages.

Machine Translation of Nishikawa, "Topic and measure of solid polymer," *Technology of fuel cell* 1(1), Jun. 2010, 4 pages.

Machine Translation of "High-molecular advanced material One Point 7," *Fuel cell and macromolecule* 1(1), Nov. 2005, 4 pages.

* cited by examiner

Fig. 8 ary area of the electrode) and cell voltage (in volts) for a fuel cell
HOT PRESSED, DIRECT DEPOSITED CATALYST LAYER

BACKGROUND

A proton exchange membrane fuel cell (PEMFC) includes an anode, a cathode and a membrane between the anode and cathode. In one example, hydrogen gas is fed to the anode and air or pure oxygen is fed to the cathode. At the anode, an anode catalyst causes the hydrogen molecules to split into protons (H$^+$) and electrons (e$^-$). The protons pass through the membrane to the cathode while the electrons travel through an external circuit to the cathode, resulting in production of electricity. At the cathode, a cathode catalyst causes the oxygen molecules to react with the protons and electrons from the anode to form water, which is removed from the system.

The membrane is oriented between the cathode catalyst layer and the anode catalyst layer. The catalyst layers and the membrane define a membrane electrode assembly (MEA) or a catalyst coated membrane (CCM). The CCM can be formed by a decal transfer process. In a decal transfer process, a catalyst ink is applied onto a decal to form a catalyst layer. The catalyst ink used to form the catalyst layer commonly contains an ionomer, a supported catalyst and a solvent. The decal can be formed, for example, of Teflon® by DuPont, USA. The decal/catalyst layer assembly is then arranged on the membrane with the catalyst layer adjacent to the membrane, and the assembly is hot pressed to transfer the catalyst layer to the membrane. Following hot pressing, the decal is peeled off or removed, leaving the catalyst layer on the membrane. An anode catalyst layer and a cathode catalyst layer can be applied to the membrane in this manner.

Platinum supported on carbon is typically used as the catalyst in PEMFCs. In order to reduce material costs, it is desirable to use low platinum loading electrodes, such as electrodes having a platinum loading of about 0.4 milligram platinum or less per square centimeter of electrode (mg Pt/cm$^2$). One method for reducing loading involves reducing the thickness of the catalyst layer. However, thin catalyst layers (i.e., less than about 4 microns) are difficult to create using a decal transfer process.

SUMMARY

A method of fabricating a membrane electrode assembly includes the steps of depositing a catalyst ink directly onto a membrane to form a catalyst coated membrane and hot pressing the catalyst coated membrane. The catalyst coated membrane has a catalyst layer that includes a catalyst and an ionomer.

BRIEF DESCRIPTION OF THE DRAWINGS

FIG. 1b is an enlarged view of a cathode catalyst layer of FIG. 1a.

DETAILED DESCRIPTION

Fuel cells convert chemical energy to electrical energy using one or more fuel cell repeat units. The fuel cell repeat unit described herein includes a catalyst layer formed by directly depositing a catalyst ink onto a membrane and hot pressing the catalyst layer to soften an ionomer of the catalyst layer.

Figure 1A:
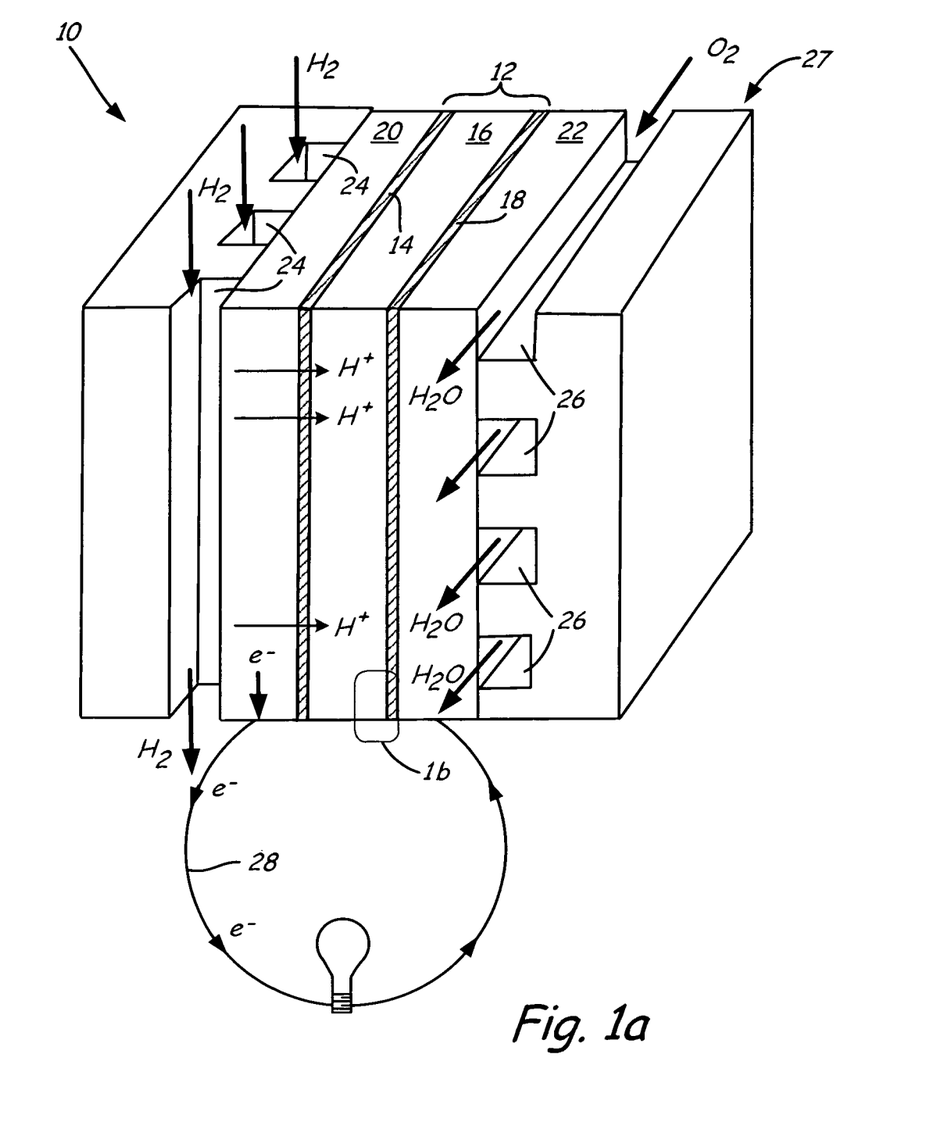
FIG. 1a is a schematic of a fuel cell repeat unit.

FIG. 1a illustrates a perspective view of one example fuel cell repeat unit 10, which includes catalyst coated membrane (CCM) 12 (having anode catalyst layer (CL) 14, membrane 16 and cathode catalyst layer (CL) 18), anode gas diffusion layer (GDL) 20, cathode gas diffusion layer (GDL) 22, anode flow field 24 and cathode flow field 26. Anode CL 14 and cathode CL 18 are deposited directly onto opposite sides of membrane 16. Together anode CL 14, membrane 16 and cathode CL 18 form CCM 12. Fuel cell repeat unit 10 can have coolant flow fields adjacent to anode flow field 24 and cathode flow field 26. Coolant flow fields are not illustrated in FIG. 1a.

Anode GDL 20 faces anode flow field 24 and cathode GDL 22 faces cathode flow field 26. Anode CL 14 is positioned between anode GDL 20 and membrane 16, and cathode CL 18 is positioned between cathode GDL 22 and membrane 16. This assembly, once bonded together by known techniques, is known as a unitized electrode assembly (UEA) 27. In one example, fuel cell repeat unit 10 is a proton exchange membrane fuel cell (PEMFC) that uses hydrogen fuel (i.e., hydrogen gas) and oxygen oxidant (i.e., oxygen gas or air). It is recognized that fuel cell repeat unit 10 can use alternative fuels and/or oxidants.

In operation, anode GDL 20 receives hydrogen gas (H$_2$) by way of anode flow field 24. Anode CL 14, which contains a noble metal catalyst such as platinum, causes the hydrogen molecules to split into protons (H$^+$) and electrons (e$^-$). Membrane 16 allows the protons to pass through to cathode CL 18, while preventing electrons to pass through. The electrons travel through external circuit 28 to cathode CL 18, resulting in a production of electrical power. Air or pure oxygen (O$_2$) is supplied to cathode GDL 22 through cathode flow field 26. At cathode CL 18, oxygen molecules react with the protons and electrons from anode CL 14 to form water (H$_2$O), which then exits fuel cell repeat unit 10, along with excess heat.

Membrane 16 is a semi-permeable membrane. Membrane 16 allows movement of protons and water but does not conduct electrons. Therefore, only protons and water from anode CL 14 move through membrane 16 to cathode CL 18. Membrane 16 can be formed of an ionomer. An ionomer is a synthetic polymer with ionic properties. In one example, membrane 16 is formed of a perfluorosulfonic acid (PFSA)-containing ionomer, such as Nafion® by E.I. DuPont, USA. In another example, membrane 16 is formed of a hydrocarbon ionomer. The composition of membrane 16 affects the operating temperature of fuel cell repeat unit 10. For example, hydrocarbon ionomers may have a higher glass transition temperature, which enables a hydrocarbon ionomer membrane 16 to be operated at a higher temperature than a PFSA ionomer membrane 16.

Cathode CL 18 is adjacent to the cathode side of membrane 16. Cathode CL 18 includes an ionomer and a catalyst, as described further below. The catalyst of cathode CL 18 promotes electrochemical reduction of oxidant. In one example, the catalyst is platinum supported on carbon. Cathode CL 18 can have a low catalyst loading. For example, cathode CL 18 can have a loading of less than about 0.4 milligrams platinum per square centimeter of cathode CL 18. In another example, cathode CL 18 has a loading of less than about 0.2 milligrams platinum per square centimeter of cathode CL 18. Low platinum loading reduces material costs of the electrode. As described further below, cathode CL 18 can be formed of a plurality of thin layers in which each layer has a low catalyst loading.

The ionomer to carbon weight ratio (I/C) of cathode CL 18 can be varied. The carbon weight of the I/C ratio is the weight of the carbon supports of the catalyst. In one example, I/C is between about 0.6 and about 1.1.

Adjusting the catalyst loading, the platinum weight percentage in the catalyst and the I/C ratio affects the thickness of cathode CL 18. For example, at a platinum loading of 0.2 milligrams platinum per square centimeter of cathode CL 18, 20 wt % Pt catalyst and an I/C ratio of 1.1, cathode CL 18 has a thickness of about 29 microns, and at a platinum loading of 0.1 milligrams platinum per square centimeter of cathode CL 18, 70 wt % Pt catalyst and an I/C ratio of 0.6, cathode CL 18 has a thickness of less than about 2 microns. As illustrated, cathode CL 18 can be a thin layer, such as less than or equal to about 4 microns thick, and more particularly between about 1 and about 2 microns thick, where thickness is measured along the axis extending between cathode CL 18 and anode CL 14 (i.e., the horizontal axis in FIG. 1).

Anode CL 14 is adjacent to the anode side of membrane 16, opposite cathode CL 18 along the horizontal axis. Similar to cathode CL 18, anode CL 14 includes an ionomer and a catalyst. The catalyst of anode CL 14 promotes electrochemical oxidation of fuel (i.e., hydrogen). Anode CL 14 can have a structure similar to that described above for cathode CL 18, although anode CL 14 and cathode CL 18 can have different compositions or different equivalent weight (EW) ionomers. EW is the amount of ionomer in grams that contains 1 mol of ionic groups and indicates the ionic content of the ionomer. More specifically, a low EW ionomer has a high ionic content relative to a high EW ionomer.

Fuel cell repeat unit 10 is formed by creating CCM 12 having anode CL 14 and cathode CL 18 on either side of membrane 16, and then combining CCM 12 with anode GDL 20 and cathode GDL 22 which have not been coated with catalyst. A fuel cell can contain a plurality of fuel cell repeat units 10 to generate the required electricity.

Figure 1B:
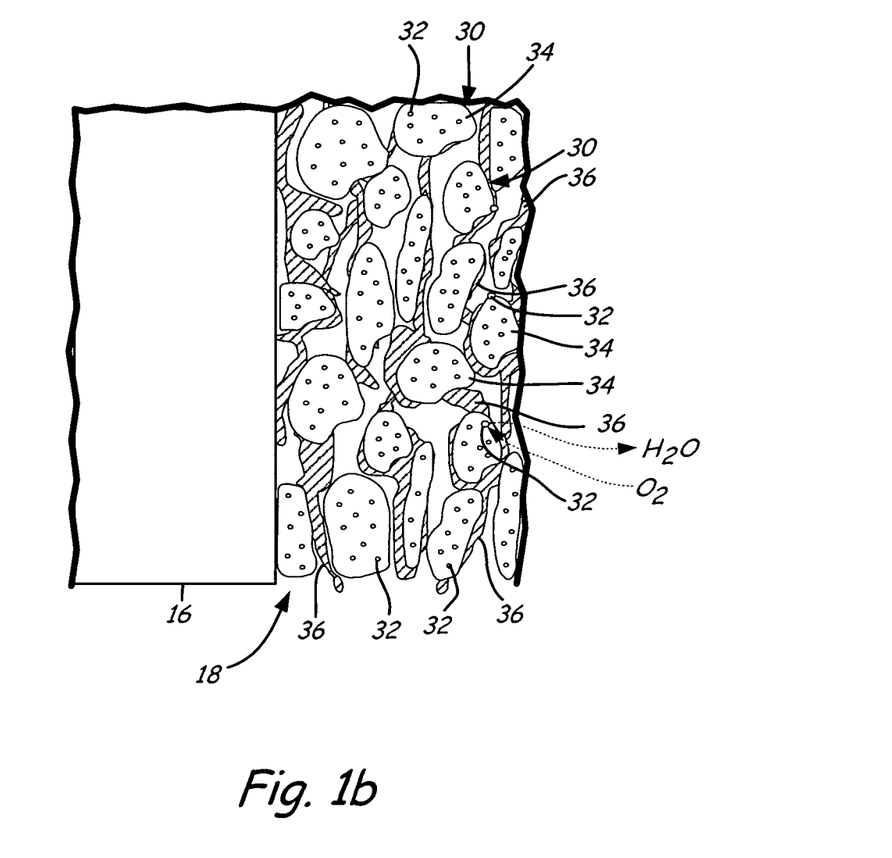

FIG. 1b is an enlarged view of cathode CL 18 of FIG. 1a, which includes catalyst 30 (having catalyst particles 32 and catalyst support 34) and ionomer 36. Ionomer 36 of cathode CL 18 contacts catalysts 30 to form a layer having catalyst particles 32 finely dispersed throughout.

Catalyst 30 of cathode CL 18 promotes electrochemical reduction of oxidant. As shown in FIG. 1b, catalyst 30 includes catalyst particles 32 supported by or on catalyst supports 34. Catalyst supports 34 are electrically conductive supports, such as carbon black supports. Catalyst particles 32 can be noble metal catalyst particles, such as particles of ruthenium, rhodium, palladium, silver, osmium, iridium, platinum and gold and alloys thereof. In one example, catalyst 30 is carbon supported platinum particles having 50 weight percent platinum and 50 weight percent carbon (known as 50/50 Pt/C). However, one skilled in the art will recognize that catalysts having different Pt/C ratios can be used.

In cathode CL 18, catalyst particles 32 promote the formation of water according to the oxidation reduction reaction: $O_2+4H^++4e^-\rightarrow 2H_2O$. Catalyst particles 32 are only active when they are accessible to protons, electrons and the reactant. Regions of cathode CL 18 accessible to these three phases are referred to as the three-phase boundary. Increasing the three-phase boundary increases the performance of the fuel cell cathode CL 18 of which it forms a part.

Ionomer 36 in cathode CL 18 connects membrane 16 to catalyst particles 32 on an ionic conductor level. In one example, ionomer 36 of cathode CL 18 is a perfluorosulfonic acid (PFSA)-containing ionomer, such as Nafion® by DuPont, USA. Ionomer 36 of cathode CL 18 can be the same as or different than the ionomer of membrane 16. For example, ionomer 36 of cathode CL 18 and the ionomer of membrane 16 can have different EWs.

Ionomer 36 creates a scaffolding structure between catalyst supports 34 of catalyst 30. Ionomer 36 creates a porous structure that enables gas to travel through cathode CL 18 and water to be removed from cathode CL 18. Ionomer 36 also transfers protons from membrane 16 to active catalyst sites on catalyst particles 32. Improving the $H^+$ conductivity of cathode CL 18 improves the performance of fuel cell repeat unit 10 and the fuel cell of which it forms a part, provided it does not negatively affect oxygen transport. Anode CL 14 can have the same structure as cathode CL 18.

Figure 2A:
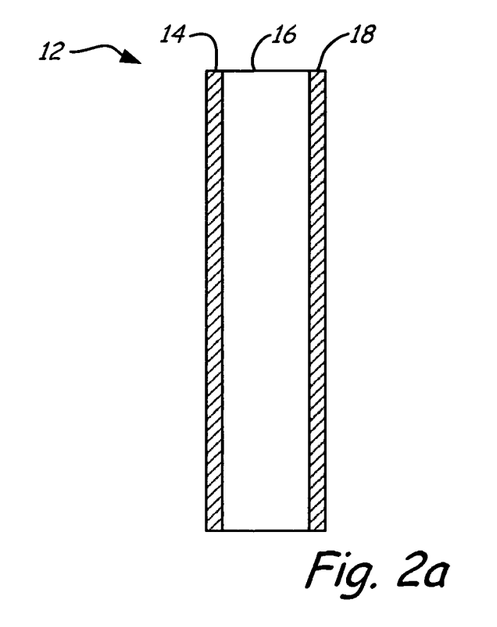
FIGS. 2a and 2b illustrate a method of forming a catalyst coated membrane by directly depositing catalyst layers on a membrane and hot pressing the catalyst coated membrane.
Figure 2B:
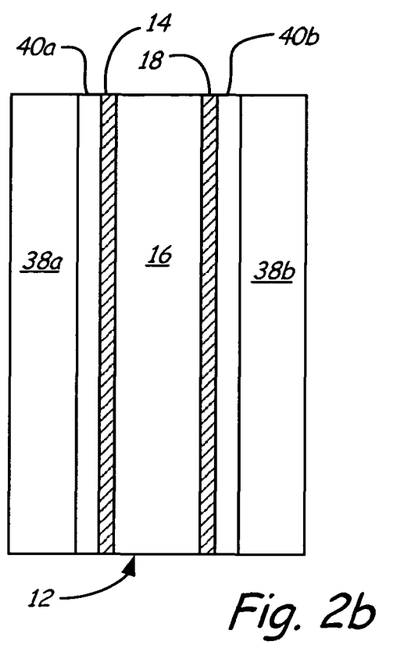

FIGS. 2a and 2b illustrate a method of forming CCM 12. FIGS. 2a and 2b will be described with respect to cathode CL 18. It is recognized that anode CL 14 can have the same structure and be formed by the same method as cathode CL 18.

FIG. 2a schematically illustrates CCM 12 after cathode CL 18 has been directly deposited onto membrane 16. Cathode CL 18 can be formed directly on membrane 16 by applying or depositing a catalyst ink directly onto membrane 16. Catalyst ink is a homogenous liquid solution or dispersion containing a catalyst, an ionomer and a solvent.

The catalyst has been described above and can include noble metal catalyst particles on carbon supports. The ionomer of the catalyst ink can be in liquid phase. For example, the ionomer can be dissolved or dispersed in a solvent. Many ionomers are readily available in a liquid dispersion form. The ionomer can be a fluoro-containing ionomer. For example, the ionomer can be a perfluorosulfonic acid (PFSA)-containing ionomer, such as Nafion® by E.I. DuPont, USA. Aggressive mixing, such as ultrasonic mixing or ball milling, can be used to create the homogenous catalyst ink comprised of the catalyst, ionomer and solvent.

Methods of direct deposition of catalyst ink include, but are not limited to, ultrasonic spraying and air brushing. For ultrasonic spraying, the catalyst ink is provided to an ultrasonic spray nozzle at a predetermined flow rate. The nozzle breaks the catalyst ink into a very fine mist which is directed at the appropriate surface of membrane 16 (i.e., the cathode side of the membrane). The nozzle can include air jets to shape the spray pattern. In one application, the nozzle can be moved while membrane 16 is maintained at a fixed position. The movement of the nozzle relative to membrane 16 (e.g., pace, pattern) and the distance of the nozzle from membrane 16 can be controlled to tailor the direct deposition of cathode CL 18 on membrane 16. Alternatively, membrane 16 can be moved while the nozzle is maintained at a fixed location. In this situation, the movement of membrane 16 (e.g., pace, pattern) and the distance of membrane 16 from the nozzle can be controlled to tailor the direct deposition of cathode CL 18 on membrane 16.

After the catalyst ink is deposited directly on membrane 16, the solvent of the catalyst ink evaporates leaving the catalyst and the ionomer on membrane 16 to form cathode CL 18. Membrane 16 can be heated during the deposition process to assist in the evaporation process. Anode CL 14 can be formed on membrane 16 in a similar manner. After cathode CL 18 and anode CL 14 are deposited directly on membrane 16, CCM 12 is positioned in a hot pressing assembly.

FIG. 2b schematically represents CCM 12 positioned in a hot pressing assembly. The hot pressing assembly includes first and second hot pressing plates or fixtures 38a, 38b and first and second decals 40a, 40b. First and second hot pressing plates 38a, 38b are approximately parallel and are spaced apart from one another. First hot pressing plate 38a is approximately parallel to anode CL 14, and second hot pressing plate 38b is approximately parallel to cathode CL 18. First and second hot pressing plates 38a, 38b apply heat and pressure to CCM 12. First hot pressing plate 38a presses anode CL 14 towards membrane 16 and cathode CL 18, and second hot pressing plate 38b presses cathode CL 18 in the opposite direction (i.e., towards membrane 16 and anode CL 14). During the hot pressing process, first and second hot pressing plates 38a, 38b sandwich CCM 12. First and second hot pressing plates 38a, 38b are solid plates designed to heat and apply load or pressure in a direction towards one another. In one example, first and second hot pressing plates 38a, 38b are steel or carbon plates. Direct contact between first and second hot pressing plates 38a, 38b and CCM 12 can damage or degrade cathode CL 18 and/or membrane 16 under certain conditions.

First and second decals 40a, 40b protect anode and cathode CLs 14, 18 and membrane 16 from damage by first and second hot pressing plates 38a, 38b. First decal 40a is positioned between anode CL 14 and first hot pressing plate 38a, and second decal 40b is positioned between cathode CL 18 and second hot pressing plate 38b. The details of first and second decals 40a, 40b will be described with reference to second decal 40b and can apply equally to first decal 40a.

Second decal 40b is a film having a geometric area greater than or equal to the parallel surface of cathode CL 18 so that second decal 40b entirely covers the outer exposed surface of cathode CL 18 that is parallel to second hot pressing plate 38b. Second decal 40b is thermally conductive and transfers heat from second hot pressing plate 38b to cathode CL 18. Second decal 40b is also thermally stable at the temperatures experienced during the hot pressing process and does not adhere to cathode CL 18. For example, second decal 40b can be formed of an ionomer that is thermally stable at a temperature up to about 260 degrees Celsius (500 degrees Fahrenheit). Example materials for second decal 40b include, but are not limited to, polytetrafluoroethylene (PTFE) films like a Teflon® film by DuPont, USA and polyethylenetetrafluoroethylene (ETFE) films such as Tefzel® by DuPont, USA. The thickness of second decal 40b can be varied. In one example, second decal 40b has a thickness between about 0.05 millimeters and about 0.3 millimeters (between about 2 mils and about 10 mils).

Second decal 40b can be a solid film or a porous film. For example, second decal 40b can be a solid film which does not contain pores, such as a solid ETFE film. Alternatively, second decal 40b can be a porous film. For example, second decal 40b can be a porous PTFE film, such as DW233 by DeWAL Industries of Saunderstown, Rhode Island, USA. DW233 has a pore size of less than about 0.2 microns. In another example, second decal 40b is a porous film having a pore size between about 0.1 micron and about 5 microns.

The hot pressing process is carried out at a specified pressure and temperature for a specified duration. The hot pressing conditions (temperature, pressure, duration) are designed to soften the ionomer of cathode CL 18 from a solid state without melting or degrading the materials of cathode CL 18 or membrane 16. For example, the hot pressing temperature can be approximately equal to the glass transition temperature of the ionomer of cathode CL 18 so that the ionomer is softened. The glass transition temperature is sometimes referred to as the softening temperature. At the glass transition temperature, a polymer changes from a solid, glass-like state to a flexible, rubber-like state.

The temperature of the hot pressing process is approximately equal to the glass transition temperature of the ionomer of cathode CL 18 and can be slightly less due to the pressure applied during the process. Pressure applied by first and second hot pressing plates 38a, 38b enables softening of the ionomer of cathode CL 18 at temperatures slightly below the glass transition temperature. In a specific example, the hot pressing temperature is equal to about $T_{glass}-x$, where $T_{glass}$ is the glass transition temperature of the ionomer of cathode CL 18 in degrees Celsius and x is 5. Applying a lower temperature (i.e., a temperature below the glass transition temperature of the ionomer) reduces the risk of degrading cathode CL 18 and membrane 16. Additionally, the duration of the hot pressing process is varied so that the ionomer is softened without degrading cathode CL 18 and membrane 16. Example hot pressing conditions include applying a pressure between about 345 kilopascals (kPa) (50 pounds-force per square inch (psi)) and about 10,342 kPa (1500 psi) and a temperature between about 130 degrees Celsius and about 146 degrees Celsius (266 degrees Fahrenheit and about 295 degrees Fahrenheit) for between about 4 minutes and about 30 minutes.

Direct deposition of cathode CL 18 on membrane 16 enables the formation of a thin, low catalyst loading catalyst layer. Decal transfer methods have not produced satisfactory thin, low catalyst loading catalyst layers. First, thin layers are generally difficult to transfer by decal transfer methods. Additionally, if the decal material is porous, material can be lost through the pores during the transferring process. These problems are not experienced when the cathode CL 18 is formed by directly depositing a catalyst ink onto membrane 16.

Cathode CL 18 can have a low platinum loading, which reduces material costs of the electrode. In one example, cathode CL 18 has a platinum loading of less than about 0.4 mg Pt/cm$^2$. In another example, cathode CL 18 has a platinum loading less than about 0.2 mg Pt/cm$^2$ and more specifically between about 0.1 and about 0.2 mg Pt/cm$^2$.

Techniques for direct deposition of catalyst ink, such as ultrasonic spraying, form thin, low catalyst loading catalyst layers. Directly deposited cathode CL 18 is hot pressed, and first and second decals 40a, 40b protect CCM 12 during the hot pressing process. Hot pressing directly deposited cathode CL 18 to soften the ionomer of cathode CL 18 improves the performance of fuel cell repeat unit 10 and the fuel cell because of the reduced resistance associated with cathode CL 18, where resistance associated with cathode CL 18 include catalyst layer resistance and interfacial resistance. Tests have shown that direct deposition of cathode CL 18 followed by hot pressing to soften the ionomer of cathode CL 18 reduces resistance associated with cathode CL 18 by at least 20%. In a specific example, resistance associated with cathode CL 18 was reduced by about 24%. Without an intention to be bound by any theory, the lower catalyst layer resistance may be caused by improved conductivity within cathode CL 18. As discussed above, the catalyst particles of cathode CL 18 are only active when they are accessible to protons, electrons and the reactant. Further, the ionomer must be significantly close to the catalyst particles to transfer protons to the catalyst particles. Hot pressing cathode CL 18 to soften the ionomer improves the conductivity of cathode CL 18 because the ionomer is repositioned closer to the catalyst particles during the hot pressing process. Further, repositioning the ionomer during the hot pressing process may also improve contact between cathode CL 18 and membrane 16 and reduce interfacial resistance. Although the benefits discussed above are with respect to cathode CL 18, similar benefits also apply to anode CL 14.

Additionally, first and second decals 40*a*, 40*b* are positioned between first and second hot pressing plates 38*a*, 38*b* and the respective catalyst layer during the hot pressing process. First and second decals 40*a*, 40*b* protect CCM 12 from damage by first and second hot pressing plates 38*a*, 38*b*. First and second decals 40*a*, 40*b* can be solid or porous films. Test results have shown improved performance results for fuel cells having cathode CL 18 which has been hot pressed with porous second decal 40*b* compared to solid second decal 40*b*. Without the intention of being bound by any theory, porous second decal 40*b* may create porosity on the surface of cathode CL 18. This porosity may improve the ability of reactants to reach the catalyst particles and increase the three-phase boundary. Similar results are expected for anode CL 14.

Figure 3:
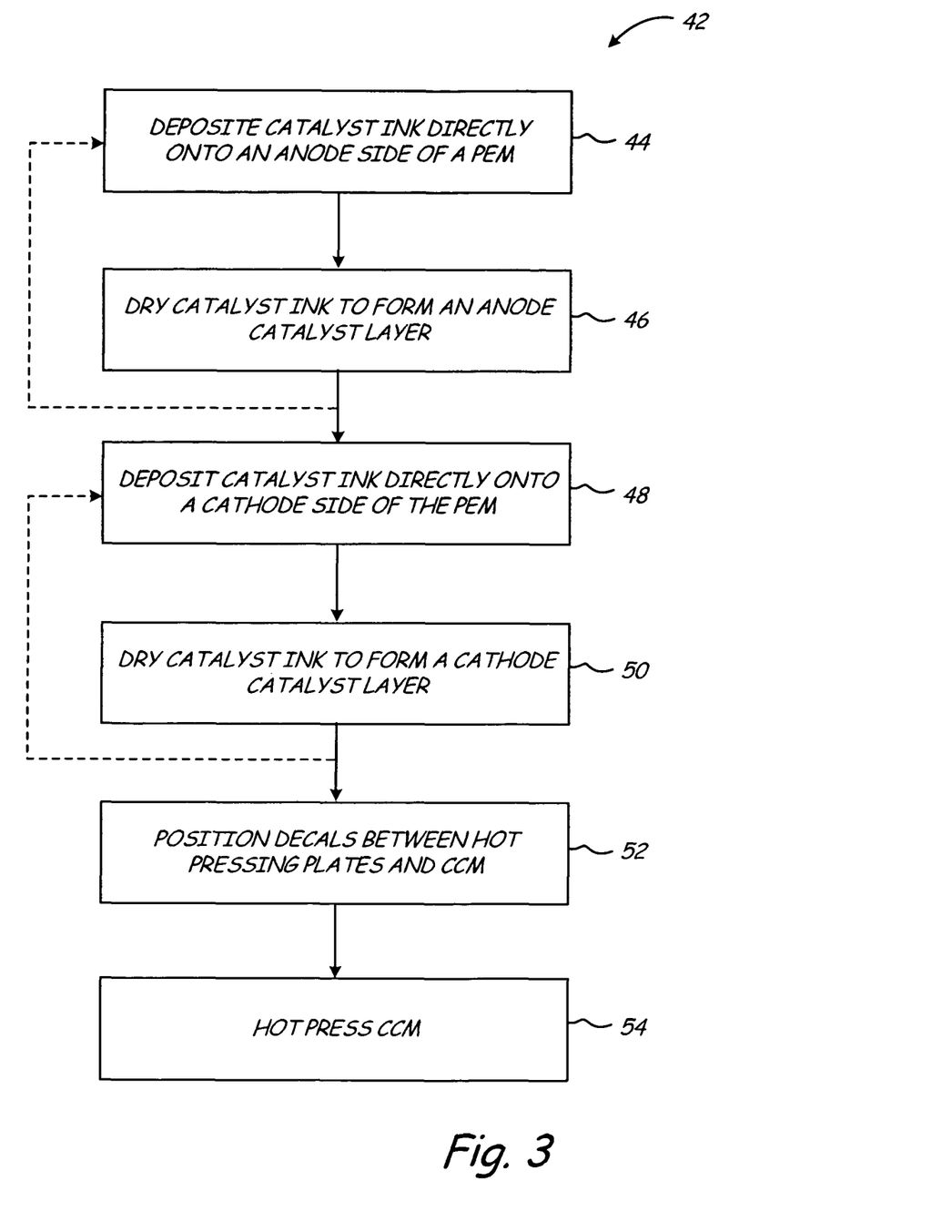
FIG. 3 is a block diagram representing a method of forming a catalyst coated membrane by directly depositing catalyst layers on a membrane and hot pressing the catalyst coated membrane.

FIG. 3 is a block diagram illustrating process 42 of forming CCM 12 of FIG. 1*a* by directly depositing anode CL 14 and cathode CL 18 on membrane 16 and hot pressing. Process 42 includes the steps of depositing catalyst ink directly on an anode side of a proton exchange membrane (step 44), drying the catalyst ink to form an anode catalyst layer (step 46), depositing catalyst ink directly on a cathode side of the proton exchange membrane (step 48), drying the catalyst ink to form a cathode catalyst layer (step 50), positioning decals between hot pressing plates and the catalyst coated membrane (CCM) (step 52) and hot pressing the CCM (step 54). In step 44, catalyst ink is directly deposited on the anode side of a membrane. As described above, the catalyst ink is formed of a catalyst, a solvent and an ionomer. Example direct deposition techniques for catalyst ink include spraying techniques that provide adequate atomization ink, such as ultrasonic spraying and air brushes.

The catalyst ink is dried to form an anode catalyst layer in step 46. During the drying step, the solvent is removed from the catalyst ink by evaporation leaving the catalyst and the ionomer on the anode side of the membrane. In one specific example, the membrane is heated during direct deposition to assist the evaporation process. The resulting catalyst layer can have a low platinum loading, such as between about 0.1 and about 0.2 mg Pt/cm$^2$.

As illustrated, steps 44 and 46 can be repeated so that anode CL contains two or more discrete layers. For example, the anode CL can be formed by spraying a first layer of catalyst ink on the membrane followed by spraying a second layer of catalyst ink on the first layer of catalyst ink. The catalyst ink of the first layer may be different than that of the second layer to form a gradient across the thickness of the anode CL. For example, the first and second catalyst inks can have different platinum loadings or different ionomers.

In step 48, catalyst ink is directly deposited on the cathode side of the membrane. Direct deposition techniques similar to those described above for step 44 can be used. The catalyst ink is dried in step 50 to form a cathode CL which contains a catalyst and an ionomer. A cathode CL having two or more discrete layers can be formed as described above for the anode CL.

The membrane, cathode CL and anode CL form a catalyst coated membrane (CCM). The CCM is positioned in a hot press assembly have first and second hot pressing plates approximately parallel to one another. The CCM is positioned so that the anode CL is approximately parallel to the first hot pressing plate and the cathode CL is approximately parallel to the second hot pressing plate.

Next, in step 52, decals are positioned between the hot pressing plates and the CCM. The hot pressing plates are heated plates, such as steel or carbon plates, that apply a specified temperature and pressure to the CCM during a hot pressing process. The decals are films which have a high thermal stability. For example, the decals can be PTFE films, such as Teflon® films by DuPont, USA or polyethylenetetrafluoroethylene (ETFE) films such as Tefzel® by DuPont, USA. Directly contacting the CCM with the hot pressing plates can damage the CCM. The decals are positioned between the hot pressing plates and the anode and cathode catalyst layers of the CCM. The first decal is sized to cover the entire surface of the anode catalyst layer that is parallel to the first hot pressing plate, and the second decal is sized to cover the entire surface area of the cathode catalyst layer that is parallel to the adjacent second hot pressing plate. The decals prevent or reduce damage to the CCM caused by the hot pressing plates.

Then, in step 54, the CCM is hot pressed. Hot pressing is achieved by applying specified pressure or load and temperature to the hot pressing plates for a specified duration. The temperature, pressure and duration can be varied. In one example, the hot pressing process is conducted under conditions which soften but do not melt the ionomer of the anode catalyst layer and/or the cathode catalyst layer. For example, the hot pressing temperature can be equal to approximately the glass transition temperature of the ionomer of cathode catalyst layer so that the ionomer of the cathode catalyst layer becomes flexible or softens. The heat and pressure of the hot pressing process repositions the ionomer of the cathode catalyst layer. This improves the conductivity of the ionomer, reduces resistance of the catalyst layer and increases contact between the membrane and the catalyst layer(s). Following the hot pressing process, the decals are removed from the CCM and the CCM is inserted into a fuel cell repeat unit. The decals are not present in the final fuel repeat unit. Although the above method is described as a batch process, the catalyst coated membrane can alternatively be formed by a continuous process using a double belt press for example.

Process 42 enables the formation of thin, low catalyst loading anode and cathode catalyst layers on a membrane. For example, process 42 can form a catalyst layer having a platinum catalyst loading of about 0.1 mg Pt/cm$^2$, an ionomer to carbon ratio of about 0.6 and a thickness of less than about 2 microns. Previous methods of forming anode and cathode catalyst layers, such as decal transfer processes, could not form satisfactory layers less than or equal to 4 microns thick.

Hot pressing the anode and cathode catalyst layers increases the conductivity of the respective layers and results in improved contact between the membrane and the catalyst layers. Positioning a film decal between the respective catalyst layer and the hot pressing plate during the hot pressing process protects the catalyst layer and the membrane from damage from direct contact with the hot pressing plate. Further, positioning a porous film decal between the hot pressing plate and the respective catalyst layer may create porosity on the surface of the catalyst layer and further improve the performance of the fuel cell.

Although the above examples have illustrated forming both the cathode catalyst layer and the anode catalyst layer by direct deposition onto the membrane followed by hot pressing, the CCM can be formed by direct deposition of only one of catalyst layers onto the CCM. The other catalyst layer can be formed by a decal transfer process. For example, the anode catalyst layer can be formed by a decal transfer process and the cathode catalyst layer can be formed by direct deposition and hot pressing. Additionally, the cathode catalyst layer can be a thin film, low catalyst loading electrode and the anode catalyst layer may not be.

The present invention is more particularly described in the following examples that are intended as illustrations only, since numerous modifications and variations within the scope of the present invention will be apparent to those skilled in the art.

EXAMPLE 1

Cells A and B were 300 square centimeter ($cm^2$) cells built with the same membrane and anode catalyst layer. The cathode catalyst layer of cells A and B were prepared according to Table 1.

TABLE 1

| Cell # | Nafion ® EW | Catalyst Material | I/C | CCL loading (mg Pt/$cm^2$) | Preparation method |
|---|---|---|---|---|---|
| A | 1100 | 50 wt % Pt/C | 1.1 | 0.1 | Direct spray/hot pressing |
| B | 1100 | 50 wt % Pt/C | 1.1 | 0.1 | Direct spray/ no hot pressing |

The cathode catalyst layers of cells A and B were formed by ultrasonic spraying of the catalyst ink onto the membrane. The cathode catalyst layer of cell A was hot pressed at 140 degrees Celsius (285 degrees Fahrenheit) and 896 kPa (130 psi) for 10 minutes with a porous decal formed of DW233 by DeWAL Industries of Saunderstown, Rhode Island, USA. The porous decal was removed from the cathode catalyst layer before use in cell A. The cathode catalyst layer of cell B was not hot pressed.

Figure 4:
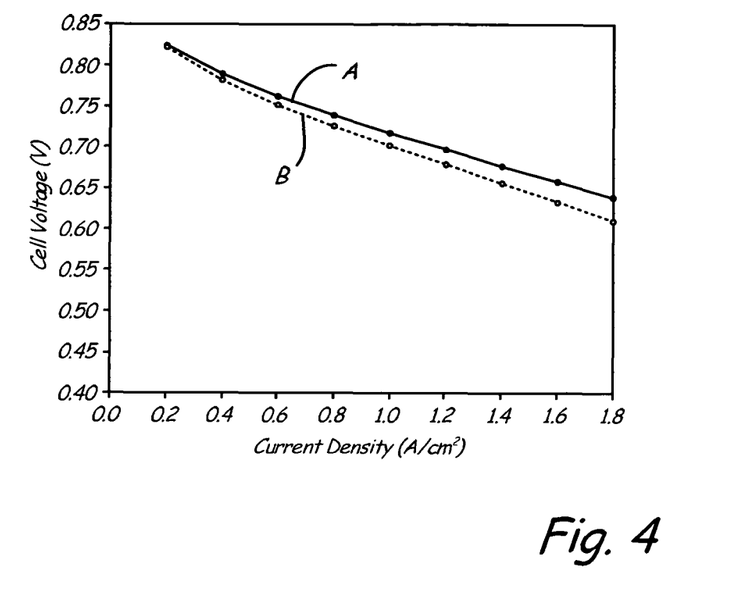
FIGS. 4-6 represent relationships between current density (fuel cell current in ampere per centimeter squared area of the electrode) and cell voltage (in volts) for a fuel cell comprising a cathode catalyst layer prepared by depositing catalyst ink on a membrane and hot pressing with a decal and a fuel cell comprising a cathode catalyst layer prepared by depositing catalyst ink on a membrane and not hot pressing.

FIG. 4 represents polarization curves for cells A and B operated as hydrogen/oxygen cells under a first set of conditions. The anode and cathode of cells A and B were operated at 100% relative humidity and an exit pressure of 40 kPa. There was 67% utilization of the hydrogen and 50% utilization of the oxygen in the cell.

The polarization curves plot cell voltage (in volts) versus current density (in ampere/$cm^2$). The power output of each cell (in Watts/$cm^2$) is given by the product of the voltage and current density. As shown by the generally higher cell voltage value in the polarization curves of FIG. 4, cell A, which was formed by direct spraying and hot pressing the cathode catalyst layer, performed better than cell B, which was formed by direct spraying but not hot pressing the cathode catalyst layer.

Figure 5:
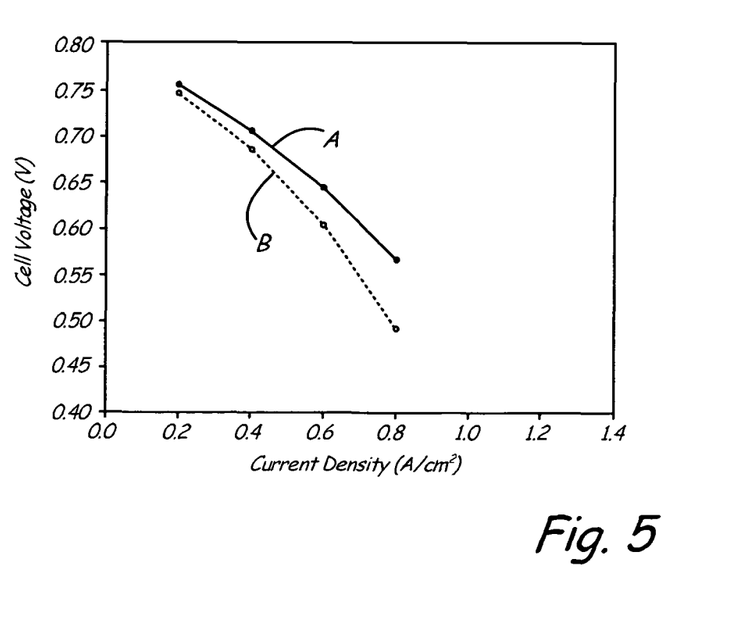

FIG. 5 represents polarization curves for cells A and B operated as hydrogen/air cells under a second set of conditions. The anode and cathode of cells A and B were operated at 100% relative humidity and an exit pressure of 40 kPa. The utilization was 83% on the anode and 67% on the cathode. As shown by the generally higher cell voltage value in the polarization curves of FIG. 5, cell A, which contained a directly deposited and hot pressed cathode catalyst layer, performed better than cell B, in which the directly deposited cathode catalyst layer was not hot pressed.

Figure 6:
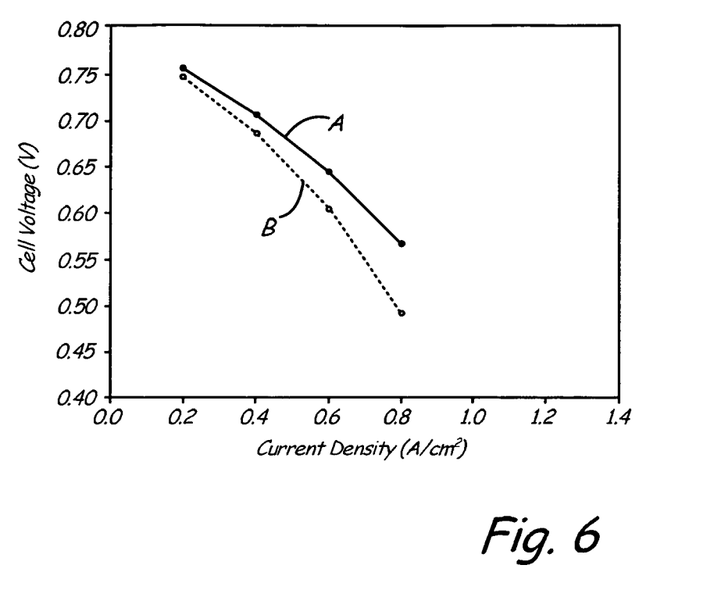

FIG. 6 represents polarization curves for cells A and B operated as hydrogen/air cells under a third set of conditions. The anode and cathode of both cells has a relative humidity of 30% and an exit pressure of 40 kPa. The utilization was 83% on the anode and 67% on the cathode. As shown by the generally higher cell voltage value in the polarization curves of FIG. 6, cell A which contained a directly deposited and hot pressed cathode catalyst layer, performed better than cell B, in which the directly deposited cathode catalyst layer was not hot pressed.

Comparing the polarization curves of FIGS. 4, 5 and 6 illustrates that a catalyst coated membrane formed by directly spraying the cathode catalyst layer onto a membrane followed by hot pressing the cathode catalyst layer with a decal results in a fuel cell having better performance compared to a catalyst coated membrane formed by directly spraying the cathode catalyst layer onto a membrane and not hot pressing. At least part of the increased performance is because hot pressing the catalyst layer significantly reduces the catalyst layer resistance and because the hot pressing likely improves contact between the membrane and the catalyst layer.

The increased performance is seen when the oxidant is pure oxygen (FIG. 4) and air (FIG. 5). The increased performance is also seen at a reduced moisture level (compare FIG. 5 and FIG. 6).

EXAMPLE 2

Cells C and D were 25 square centimeter ($cm^2$) cells built with the same membrane and anode catalyst layer. The cathode catalyst layer of cells C and D were directly deposited on the membrane according to Table 2.

TABLE 2

| Cell # | Nafion ® EW | Catalyst Material | I/C | CCL loading (mg Pt/$cm^2$) | Preparation method |
|---|---|---|---|---|---|
| C | 1100 | 50 wt % Pt/C | 1.1 | 0.1 | Direct spray/solid decal hot pressing |
| D | 1100 | 50 wt % Pt/C | 1.1 | 0.1 | Direct spray/ Porous decal hot pressing |

The cathode catalyst layers of cells C and D were deposited onto a membrane by ultrasonic spraying of a catalyst ink to form catalyst coated membranes. The catalyst coated membranes of cells C and D were hot pressed at 140 degrees Celsius (285 degrees Fahrenheit) and a pressure of 10,342 kPa (1500 psi) for 10 minutes.

For cell C, a solid polyethylenetetrafluoroethylene (ETFE) film decal was positioned between the hot pressing plate and the cathode catalyst layer during the hot pressing process. For cell D, a porous PTFE film decal was positioned between the hot pressing plate and the cathode catalyst layer during the hot pressing process. The porous film decal was DW233 by DeWAL Industries of Saunderstown, Rhode Island, USA, which has a pore size of less than 0.2 microns. The film decals were removed from the cathode catalyst layers after the hot pressing process; the film decals were not present in cells C and D.

Figure 7:
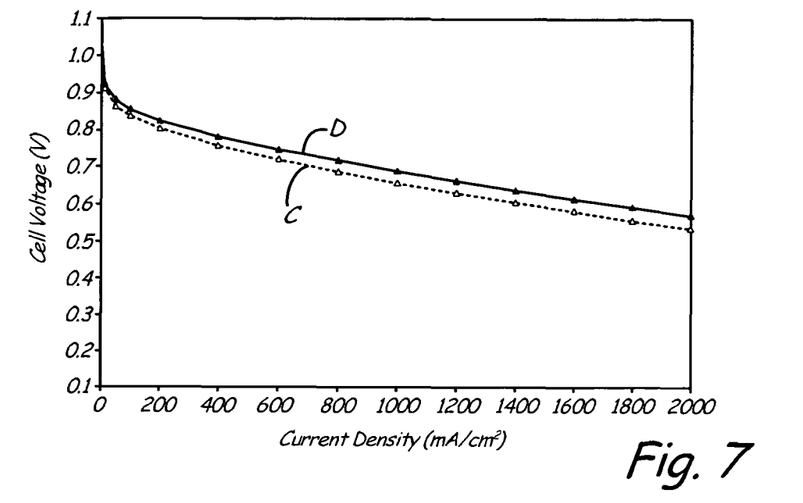
FIG. 7 and FIG. 8 represent relationships between current density (fuel cell current in ampere per centimeter squared area of the electrode) and cell voltage (in volts) for a fuel cell comprising a cathode catalyst layer hot pressed with a solid decal and a fuel cell comprising a cathode catalyst layer hot pressed with a porous decal.

FIG. 7 represents polarization curves for cells C and D operated in hydrogen/oxygen fuel cells. As illustrated by the generally higher cell voltage values, cell D, which contained a catalyst coated membrane that was hot pressed with a porous decal, had an improved performance compared to cell C, which contained a catalyst coated membrane that was hot pressed with a solid decal.

Figure 8:
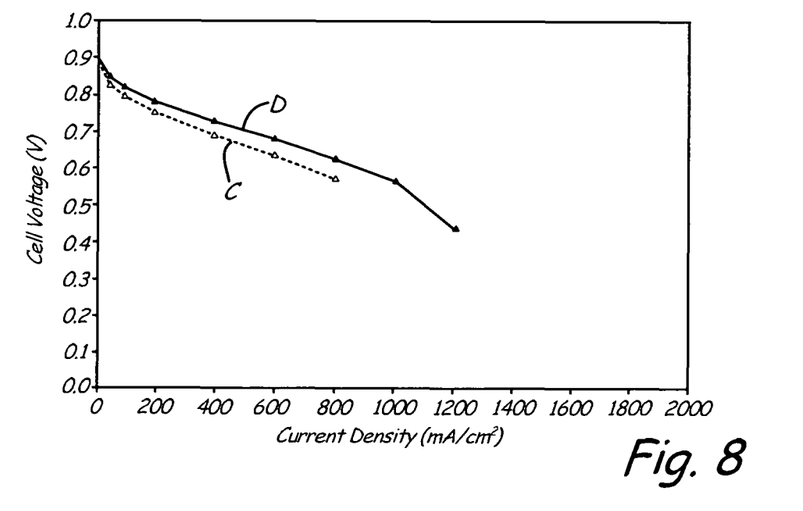

FIG. 8 represents curves for cells C and D operated in hydrogen/air fuel cells. Similar to the results of FIG. 7, cell D had an improved performance compared to cell C.

The above examples investigated the effects of direct deposition and hot pressing of the cathode catalyst layer. Similar results are expected for the anode catalyst layer, although the performance differences may be smaller in magnitude.

Although the present invention has been described with reference to preferred embodiments, workers skilled in the art will recognize that changes may be made in form and detail without departing from the spirit and scope of the invention.

The invention claimed is:

1. A method of fabricating a membrane electrode assembly (MEA), the method comprising:
   depositing a catalyst ink layer directly onto a membrane to form a catalyst coated membrane having a catalyst layer, the catalyst layer including a catalyst and an ionomer;
   identifying a glass transition temperature of the ionomer of the catalyst layer; and
   hot pressing the catalyst coated membrane to soften the ionomer of the catalyst layer at a temperature which is equal to the glass transition temperature of the ionomer of the catalyst layer, or the temperature is lower than the glass transition temperature of the ionomer of the catalyst layer and is within 5 degrees Celsius of the glass transition temperature of the ionomer of the catalyst layer,
   wherein the hot pressing includes applying a pressure which is between 345 kilopascals and 10,342 kilopascals, and
   wherein the catalyst layer of the catalyst coated membrane is formed to have a thickness which is less than about 2 microns.

2. The method of claim 1, wherein hot pressing the catalyst coated membrane comprises:
   hot pressing the catalyst coated membrane such that a first resistance associated with the catalyst layer is reduced by at least 20% with respect to a second resistance associated with the catalyst layer before the step of hot pressing.

3. The method of claim 1, wherein the catalyst layer of the catalyst coated membrane has a platinum loading of more than about 0 milligram platinum per square centimeter and less than about 0.2 milligram platinum per square centimeter.

4. The method of claim 1, wherein the catalyst layer of the catalyst coated membrane has an ionomer to carbon ratio (I/C) between about 0.6 and about 1.1.

5. The method of claim 1, wherein depositing the catalyst ink layer comprises:
   spraying the catalyst ink layer directly onto the membrane.

6. The method of claim 1, further comprising:
   depositing another catalyst ink layer directly onto the catalyst ink layer before hot pressing the catalyst coated membrane.

7. The method of claim 1, wherein hot pressing the catalyst coated membrane comprises:
   hot pressing the catalyst coated membrane with a decal positioned between the catalyst layer and a hot pressing plate.

8. The method of claim 7, wherein the decal is a polytetrafluoroethylene (PTFE) film.

9. The method of claim 7, wherein the decal is a porous decal.

10. The method of claim 9, wherein the porous decal has a pore size between about 0.1 microns and about 5 microns.

11. A membrane electrode assembly (MEA) made by a process comprising:
    directly depositing a catalyst ink layer directly onto a membrane to form a catalyst coated membrane having a catalyst layer, the catalyst layer including a catalyst and an ionomer;
    identifying a glass transition temperature of the ionomer of the catalyst layer; and
    hot pressing the catalyst coated membrane to soften the ionomer of the catalyst layer at a temperature which is equal to the glass transition temperature of the ionomer of the catalyst layer, or the temperature is lower than the glass transition temperature of the ionomer of the catalyst layer and is within 5 degrees Celsius of the glass transition temperature of the ionomer of the catalyst layer,
    wherein the hot pressing includes applying a pressure which is between 345 kilopascals and 10,342 kilopascals, and
    wherein the catalyst layer of the catalyst coated membrane is formed to have a thickness which is less than about 2 microns.

12. The MEA of claim 11, wherein a first resistance associated with the catalyst layer after the step of hot pressing is at least 20% lower than a second resistance associated with the catalyst layer before the step of hot pressing.

13. The MEA of claim 11, wherein the hot pressing comprises:
    hot pressing the catalyst layer after positioning a decal between the catalyst layer and a hot pressing plate that applies heat to the catalyst layer during hot pressing.

14. The MEA of claim 13, wherein the decal is a porous decal.

15. A method of fabricating a unitized electrode assembly (UAE), the method comprising:
    depositing a catalyst ink layer directly onto a first side of a membrane to form a catalyst coated membrane having a first catalyst layer, the first catalyst layer including a catalyst and an ionomer;
    identifying a glass transition temperature of the ionomer of the first catalyst layer;
    hot pressing the catalyst coated membrane to soften the ionomer of the first catalyst layer at a temperature which is equal to the glass transition temperature of the ionomer of the first catalyst layer, or the temperature is lower than the glass transition temperature of the ionomer of the first catalyst layer and is within 5 degrees Celsius of the glass transition temperature of the ionomer of the catalyst layer, wherein the hot pressing includes applying a pressure which is between 345 kilopascals and 10,342 kilopascals, and wherein the first catalyst layer of the catalyst coated membrane has a thickness which is less than about 2 microns;

positioning a first gas diffusion layer adjacent to the first catalyst layer after hot pressing the catalyst coated membrane such that the first catalyst layer is between the first gas diffusion layer and the membrane;

positioning a second gas diffusion layer adjacent to a second catalyst layer on a second side of the membrane, the second side of the membrane opposite the first side of the membrane; and bonding the first gas diffusion layer, the second gas diffusion layer and the catalyst coated membrane together.

16. The method of claim 15, further comprising:

positioning a decal between the first catalyst layer and a hot pressing plate before the hot pressing to prevent damage to the first catalyst layer by the hot pressing plate during the hot pressing.

17. The method of claim 16, wherein the decal is a porous decal.

18. The method of claim 15, wherein a resistance associated with the first catalyst layer is reduced by at least 20% after the step of hot pressing.

19. The method of claim 15, wherein the first catalyst layer is a cathode catalyst layer and the second catalyst layer is an anode catalyst layer.

* * * * *